E. CHABEAULT.
TELEPHONOGRAPH.
APPLICATION FILED FEB. 10, 1913.
1,135,436.
Patented Apr. 13, 1915.
3 SHEETS—SHEET 1.
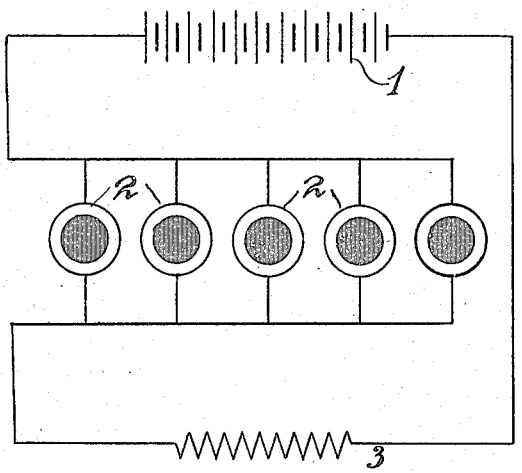
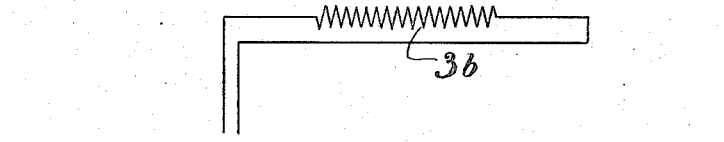
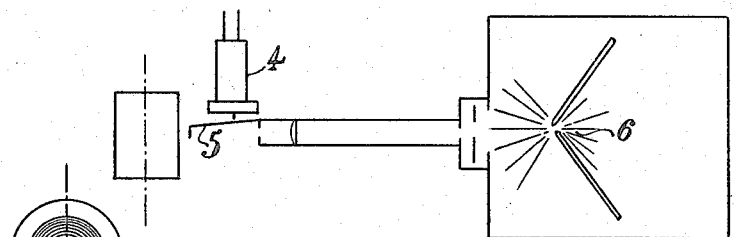
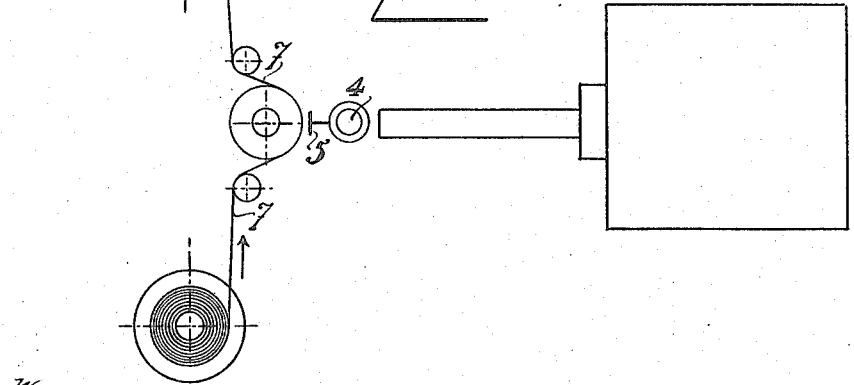
Witnesses
Inventor
Emile Chabeault
per Franks. Ankerman,
Attorney.

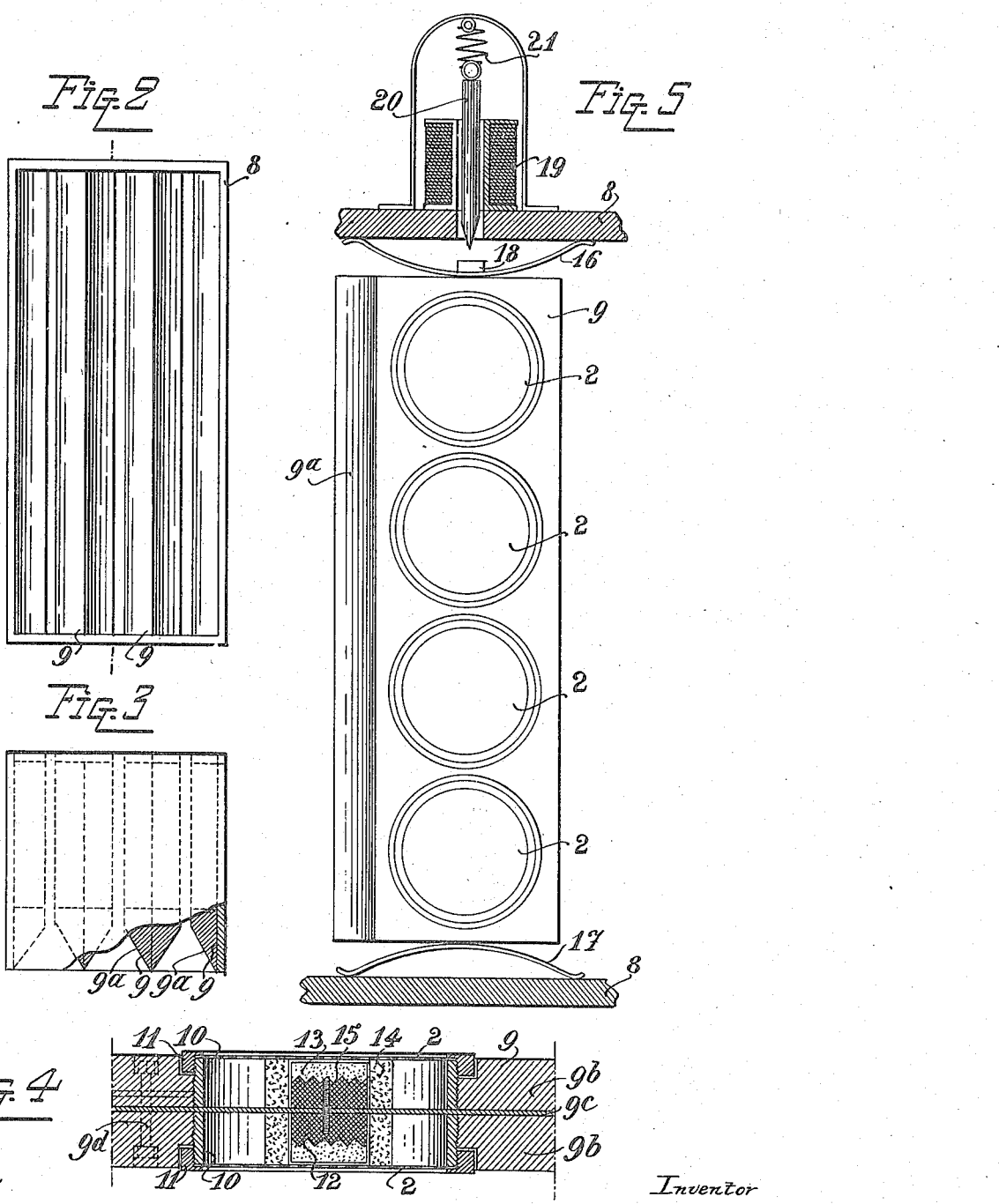

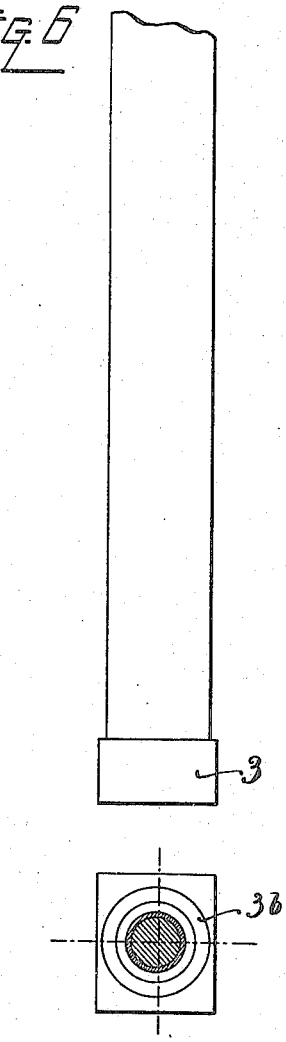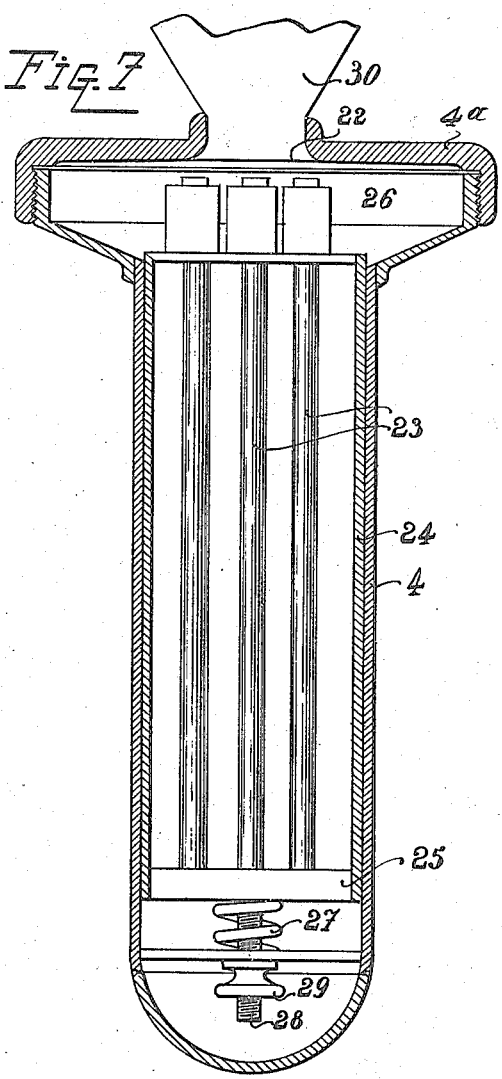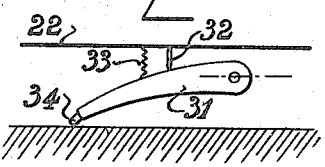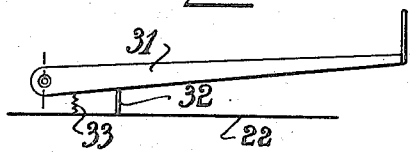

UNITED STATES PATENT OFFICE.

EMILE CHABEAULT, OF MARSEILLE, FRANCE.

TELEPHONOGRAPH.

1,135,436. Specification of Letters Patent. Patented Apr. 13, 1915.

Application filed February 10, 1913. Serial No. 747,423.

*To all whom it may concern:*

Be it known that I, EMILE CHABEAULT, a citizen of the French Republic, residing at 65 Rue de l'Abbé-de-l'Épée, Marseille, Bouches-du-Rhône, France, have invented a new and useful Improved Telephonograph, of which the following is a specification.

This invention relates to an apparatus called a telephonograph, and the purpose of said apparatus is first to collect sonorous vibrations as a spy telephone would do and to obtain by a microphonic action an undulating current of as great magnitude as is desired; second to operate by this undulating current directly or through the secondary of an induction coil a receiver, the diaphragm of which under the action of these powerful vibrations is thrown into powerful mechanical movement so that the receiver acts as a loud speaking telephone and the vibrations thus obtained can be recorded.

The features of the apparatus forming the subject of the present invention comprise in the first place the combination of the different devices and means for collecting sounds (microphonic listeners) and for amplifying them and transmitting them to a special receiver acting as a loud speaking instrument. This receiver can moreover serve to record the sounds transmitted either by engraving on wax or in continuous and unlimited fashion by heliographic action. In this last method, use is made of a roll of film which by suitable treatment may furnish one or more phonographic records.

The features of the apparatus relate also to the arrangement, construction and actuation of the principal devices, such as the parts for collecting sounds (microphones or groups of microphones) indicated by the term "listener", induction coils or self-inductance coils as well as receivers (reproducers) the purpose being to proportion the magnitude of the electromagnetic masses to the increase in available energy in the undulating current.

Other devices and advantageous arrangements will be disclosed in the following description, in particular the arrangement by which several listeners can be arranged about one stage, each intended to act upon a separate reproducer so as to give an audience an aural impression of the movement of the actors.

In the drawings, Figures 1 and 1ª are diagrammatic views showing the whole of a telephonographic installation. Figs. 2 and 3 are elevation and plan partially in section of a listener. Fig. 4 is an axial section of a double microphone. Fig. 5 is a vertical section to a larger scale of a listener, the microphone-carrying plates of which are mounted between springs. Fig. 6 is a detail of a coil. Fig. 7 is a vertical section of a reproducer. Fig. 8 shows the diaphragm of the reproducer carrying a sapphire for making a direct phonographic record. Fig. 9 shows the diaphragm of the reproducer for recording heliographically. The telephonographic apparatus of Fig. 1 comprises the devices necessary for collecting, reproducing and recording sounds. (*a*) The devices for collecting the sounds are the battery 1, the group or groups of microphones 2 and the induction coil 3. (*b*) To reproduce the sounds all that is necessary is to operate a receiver 4 by means of the microphone current, directly, or better through the medium of the induction coil secondary, this latter preferable arrangement being that shown in the drawing. (*c*) For recording all that is necessary is to cause the vibrating diaphragm of the receiver to actuate either an engraving stylus of the ordinary construction or a light screen 5 pierced with a hole to guide a ray of light from a luminous source 6 upon a sensitive roll of film 7 unrolled in front of it, the said band thus acted upon carrying a fine sinuous trace which represents the movements of the diaphragm. This film may be used to produce phonograms in the manner hereinafter explained.

The various devices which form the telephonographic apparatus have been designed to give the maximum result for the smallest volume and to give the best results from the point of view of working, and this will be described separately.

*Listener.*—The action of the sonorous vibrations upon the vibrating diaphragms of the microphones depends on the place occupied by the diaphragm in the train of waves. The actions upon two diaphragms arranged in a plane at right angles to the direction of propagation will be the more alike, for a given distance between the diaphragms, the farther the diaphragms are from the sonorous source on account of the spherical form of the waves. On the other hand it is useless to extend the microphones very far in the direction of propagation. If the microphones are 33 cm. apart the one will be in the node of a vibration while the other will be in the loop, and therefore while one is receiving useful vibrations the other will at that instant be mute. If the microphones are 66 cm. apart both will be affected by the loops of vibrations. In this condition the vibrations acting on the microphones are not simultaneous and the two actions cannot be compounded into a single result. Therefore it is desirable to combine into as restricted a space as possible all the vibrating surfaces that it is desired to use. To satisfy this condition the listeners are formed (Figs. 2 and 3) by a wooden frame 8 within which are placed partitions 9 between which are free spaces which permit the passage of the waves. The microphones 2 are disposed along these partitions in such fashion as to occupy as large an extent of their surface as possible. The partitions 9 terminate on the side from which the sound is coming in beveled edges $9^a$ (Fig. 3). With the same idea in mind of arranging as many microphones as possible in a given space, the air spaces between the plates carrying the microphones are reduced say to 5 mm. and the thickness of the plates is also reduced to a minimum by the arrangement adopted for mounting the microphones. The plates are formed of three thicknesses, two equal thicknesses $9^b$ (Fig. 4) and a much thinner portion $9^c$ for example of 2 or 3 mm., all the thicknesses being of insulating material (wood fiber or molded insulating material) and connected together by bolts such as $9^d$. The plates 9 are pierced with holes in which are lodged the microphones 2. A threaded ring 10 forms a sort of box upon which screws the flange 11 which serves to keep the vibrating diaphragms 2 in place.

In the middle of the space left in the interior of the ring 10 is screwed the block of carbon 12 which forms the stationary portion of the microphone cell, and around the blocks a mica cylinder 13 serves to inclose granules of carbon. An envelop of cotton wool 14 prevents the granules escaping into the box. The two blocks are connected by a threaded pin or bolt 15 so that the two opposite microphones of one strip are electrically connected in series. To complete the circuit it remains to connect alternately the rings of two consecutive microphones of one plate. The total thickness of the plate is about 25 mm. These arrangements enable the surface occupied by a given number of microphones to be considerably reduced. The plates might also carry two microphones in their depth. But the positions they would have would be disadvantageous inasmuch as it would be impossible for them to be subject to the same effect at the same instant; in spite of this defect the arrangement may be acceptable for powerful sounds. The settling of the granules leads in time to an increase of conductivity which may cause the current to become too strong, and result in heating of the cells. Moreover this settling diminishes the efficiency of the variations of resistance. For both reasons it is necessary to combat it. For this purpose the frame carrying the listener is arranged in such a way that it can be inverted. Periodic turning of it over hinders the settling of the granules becoming troublesome. If it is desired to avoid such inversion the plates 9 carrying the microphones 2 can be mounted between the two springs 16, 17 (Fig. 5), the plates carrying at the top an abutment 18 of wood or hard rubber. A solenoid 19 is arranged on the frame and its movable magnetic core 20 is suspended by a spring 21 in the line of the abutment. If a pulsating current passes through the solenoid the core is pulled down. Each time it is pulled down it strikes the abutment and gives the plate a sufficient jar to lessen or destroy the effects of settling. The microphones are all arranged in series and the variable resistance obtained is the sum of all the variable resistances of each microphone. Hence the necessity if $n$ microphones are employed of multiplying the resistance of the coils by $n$.

*Coils.*—On the other hand as the value of the intensity varies within the same limits as for one microphone the cross section required for the coils is the same as in the case of a single microphone. This reasoning applies as well to extra-current coils as to the primary of the induction coils and to the windings of the reproducers. The extent of the winding and its volume and in consequence, its weight, require to be multiplied by the number of microphones employed. This multiplication is effected by increasing one factor of the volume or of the weight, viz. the length. The cross section of the iron and the thickness of the coil remain constant. If the length of the coil is I for one microphone, for $n$ microphones it will be $n^1$ (Fig. 6). To facilitate the construction, as the length may attain a considerable value, elementary coils made for four or five microphones are grouped in series. The secondary $3^b$ of the induction coil 3 will occupy $n$ times the volume of the secondary for a coil for one microphone and its resistance will be chosen with reference to the length of the line.

*Reproducers.*—As the undulating current obtained has a power proportioned to the number of microphones in order to utilize it to the best advantage it is necessary to construct reproducers specially for it and to increase the extent of the magnetic field. For this purpose the number of poles acting on the vibrating diaphragm 22 is increased (Fig. 7). Bar magnets 23 are arranged in a bundle in a tube 24 of brass, the bars being fixed at their lower end to an iron disk 25 while the upper part of each bar carries a core of soft iron surrounded by a coil 26. Consecutive bars have poles of opposite sign. The tube 24 slips with slight friction into a cylindrical casing 4 to which is secured the box 4ª and in this is mounted the vibrating diaphragm 22; a spring 27 presses the cores toward the diaphragm and they are held back by a threaded pin 28 with a nut 29 for adjustment. The bar magnets may advantageously be replaced by electromagnets. There may be any desired number of poles but the numbers seven and nineteen seem to lend themselves best to the disposition of the coils. The poles are made opposite in sign in order to reduce the reluctance of the magnetic circuit of the reproducer. The coils are so connected as to produce opposite poles. The reproducer carries a trumpet 30 if it is intended to reproduce as a loud speaking instrument. If it is used for recording, the diaphragm 22 actuates an arm 31 (Fig. 8) through a pin 32 kept to its work by a spring 33. The arm 31 is hinged on a pointed axle on a crossbar secured to the box of the reproducer 4; at the end of the arm 31 there is a sapphire 34 for engraving on the wax (Fig. 8) or the arm may be prolonged and end in a screen 5 for recording photographically (Fig. 9).

*Recorders.*—The screen 5 is pierced at its center with a very small pinhole. A luminous ray passing through this hole will make an impression on the sensitized surface of a roll of film upon which it will leave a fine sinuous trace which will represent the movements of the diaphragm. As the work of engraving is obviated the line obtained will be very exact. This film 7 is unrolled at uniform speed in front of the perforated paper screen of the reproducer. When developed and fixed the film forms a block from which impressions may be made on a band of bichromated gelatin supported on a film of celluloid. This band when developed by the aid of warm water and dried will have a sinuous line in relief. If passed through a rolling mill against a sheet of lead it will give a metallic intaglio copy. The lead plate is wound helically around a drum which serves to support it. By a galvano-plastic process it is covered with a bed of nickel or copper. By this means a metallic band is obtained engraved in relief. If this metallic band is passed through a rolling mill with a band of celluloid in contact with its engraved surface it will produce a flexible copy engraved in intaglio. The rolling mill should be warmed to make this celluloid capable of receiving the imprint. The engraved band thus obtained, if unrolled uniformly, will enable a phonographic diaphragm provided with a stylus to reproduce the recorded sounds. The celluloid may be replaced by any other material which can take the membrane and remain comparatively flexible without risk of destruction.

*Multiple records.*—It is conceivable that several traces may be recorded simultaneously on a single roll of film by placing several reproducers side by side, each reproducer being connected to a distinct listener. It is thus possible to give an audience an aural impression of the movement of the actors. All that is necessary is to arrange the different listeners in different places on the actual stage. Taking the most simple case of two listeners, one on the right of the stage and the other on the left; the record will have two lines. When, for instance, the actors pass from right to left the right hand listeners will have a decreasing record while the left hand will increase. In the reproduction the phonographic diaphragm corresponding to the right hand line will readily reproduce this weakening of the sound, while the left hand one will reproduce the corresponding intensification recorded by the corresponding listener. The audience will thus have the impression that they would have before the stage itself, viz. of the actors moving.

What I claim is:

A listening device for telephonographic apparatus, consisting in a box open upon one side, a series of partitions arranged parallel in said box, all having one edge toward the open side of said box, spring cushions between the walls of said box and said partitions, and automatic means for setting each partition in vibration independently.

In testimony whereof I have signed my name to this specification in the presence of two subscribing witnesses.

EMILE CHABEAULT.

Witnesses:
   Cazaux,
   I. Moynot.